(12) United States Patent
Sury

(10) Patent No.: US 11,485,605 B2
(45) Date of Patent: Nov. 1, 2022

(54) STRAP WINDING, STORAGE, AND DISPENSING ASSEMBLY

(71) Applicant: David Sury, Sugar Land, TX (US)

(72) Inventor: David Sury, Sugar Land, TX (US)

( * ) Notice: Subject to any disclaimer, the term of this patent is extended or adjusted under 35 U.S.C. 154(b) by 123 days.

(21) Appl. No.: 17/176,488

(22) Filed: Feb. 16, 2021

(65) Prior Publication Data

US 2022/0259006 A1    Aug. 18, 2022

(51) Int. Cl.
*B65H 75/44* (2006.01)
*B65H 75/40* (2006.01)
*B60P 7/08* (2006.01)

(52) U.S. Cl.
CPC ........ *B65H 75/4471* (2013.01); *B60P 7/0846* (2013.01); *B65H 75/406* (2013.01); *B65H 75/4431* (2013.01); *B65H 75/4494* (2013.01); *B65H 2402/412* (2013.01); *B65H 2402/44* (2013.01)

(58) Field of Classification Search
CPC .............. B65H 75/406; B65H 75/4431; B65H 75/4471; B65H 75/4494; B65H 2402/44; B65H 2402/412; B60P 7/0846
See application file for complete search history.

(56) References Cited

U.S. PATENT DOCUMENTS

| | | | |
|---|---|---|---|
| 4,251,038 A * | 2/1981 | Gename | B65H 75/406 242/397.2 |
| 5,238,201 A * | 8/1993 | Jonushaitis | B65H 75/4478 242/405.3 |
| 5,961,263 A * | 10/1999 | Nunez | B60P 7/083 410/104 |
| 6,824,339 B1 * | 11/2004 | Childers | B60P 7/0846 16/110.1 |
| 7,131,608 B2 | 11/2006 | Breeden, III | |
| D555,358 S | 11/2007 | King | |
| 9,925,911 B2 | 3/2018 | Hitsman | |
| 9,981,824 B2 | 5/2018 | Goodrich | |
| 10,000,148 B1 * | 6/2018 | Haynes | B60P 7/0846 |
| 2004/0084558 A1 * | 5/2004 | Huang | B65H 54/585 242/385.4 |
| 2007/0256947 A1 | 11/2007 | Bernard | |
| 2014/0077023 A1 | 3/2014 | Foreman | |
| 2016/0046431 A1 | 2/2016 | Clater | |
| 2019/0209877 A1 * | 7/2019 | Farrell | F16D 63/008 |

* cited by examiner

*Primary Examiner* — Sang K Kim

(57) ABSTRACT

A strap winding, storage, and dispensing assembly for storing and dispensing a plurality of straps includes a spacing element engaged to and extending between a pair of plates. Each of a set of strap stowing units engaged to the pair of plates comprises a spindle having a winding element and a braking element operationally engaged thereto. The spindle can engage a respective end of a strap so that the strap is removably engaged to the spindle. The winding element is positioned to selectively rotate the spindle, in a first direction, to coil the strap therearound. The braking element is engaged to a respective one of the plates and is positioned to selectively engage the spindle, to prevent rotation thereof, to retain the strap therearound. The braking element also is positioned to selectively disengage the spindle so that the spindle can rotate in a second direction to uncoil the strap.

17 Claims, 8 Drawing Sheets

STRAP WINDING, STORAGE, AND DISPENSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

The disclosure relates to strap winding assemblies and more particularly pertains to a new strap winding assembly for storing and dispensing a plurality of straps. The present invention discloses a strap winding assembly comprising a set of strap stowing units engaged to a pair of plates, wherein each strap stowing unit can store and dispense a respective strap.

(2) Description of Related Art including information disclosed under 37 CFR 1.97 and 1.98.

The prior art relates to strap winding assemblies. Prior art strap winding assemblies may comprise containers for storing rolled straps and strap dispensing devices. Prior art strap winding assemblies also may comprise devices having a single winding element and multiple storage compartments for sequential or simultaneous winding of multiple straps, and winding devices engaged to baskets or housings. What is lacking in the prior art is a strap winding assembly comprising a set of strap stowing units engaged to a pair of plates, wherein each strap stowing unit can store and dispense a respective strap.

BRIEF SUMMARY OF THE INVENTION

An embodiment of the disclosure meets the needs presented above by generally comprising a spacing element, which is engaged to and which extends between the plates of a pair of plates so that the plates are aligned and parallel planarly positioned. Each of a set of strap stowing units engaged to the pair of plates comprises a spindle, which has a winding element and a braking element operationally engaged thereto. The spindle is rotationally engaged to and extends between the plates. The spindle is configured to selectively engage a respective end of a strap so that the strap is removably engaged to the spindle. The winding element is positioned to selectively rotate the spindle, in a first direction, to coil the strap therearound. The braking element is engaged to a respective one of the plates and is positioned to selectively engage the spindle, to prevent rotation thereof, to retain the strap around the spindle. The braking element also is positioned to selectively disengage the spindle so that the spindle is configured to rotate in a second direction to uncoil the strap therefrom.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
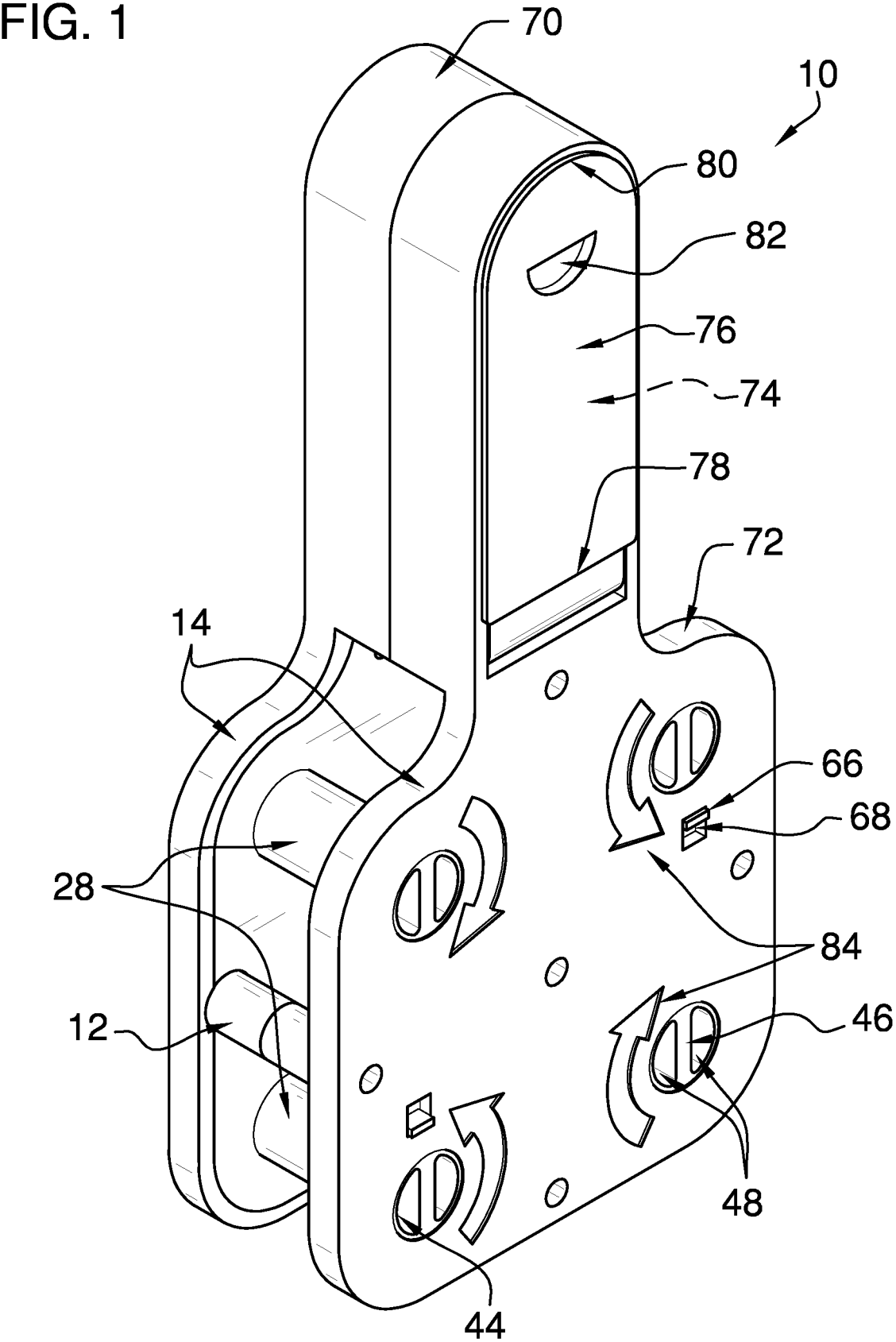
FIG. 1 is an isometric perspective view of a strap winding, storage, and dispensing assembly according to an embodiment of the disclosure.

With reference now to the drawings, and in particular to FIGS. 1 through 10 thereof, a new strap winding assembly embodying the principles and concepts of an embodiment of the disclosure and generally designated by the reference numeral 10 will be described.

As best illustrated in FIGS. 1 through 10, the strap winding, storage, and dispensing assembly 10 generally comprises a spacing element 12, which is engaged to and which extends between the plates 14 of a pair of plates 14 so that the plates 14 are aligned and parallel planarly positioned. Each plate 14 has a chamber 16 positioned therein and defining an inner wall 18 and an outer wall 20 of the plate 14. The inner wall 18 is selectively couplable to the outer wall 20.

The spacing element 12 may comprise a plurality of cylinders 22, with each of the cylinders 22 being engaged to and extending between the outer walls 20 of the pair of plates 14. The cylinder 22 is tubular and comprises a pair of segments 24, with the segments 24 being engaged singly to the outer walls 20. The segments 24 of the pair of segments 24 are selectively alignable, positioning the segments 24 for threaded insertion of a screw 26 to mutually engage the plates 14. As will become apparent, the spacing element 12 comprising of a pair of segments 24 allows for modular manufacturing of the assembly 10 based on a plane of symmetry (not shown but positioned equally distant from the plates 14 of the pair of plates 14).

Figure 6:
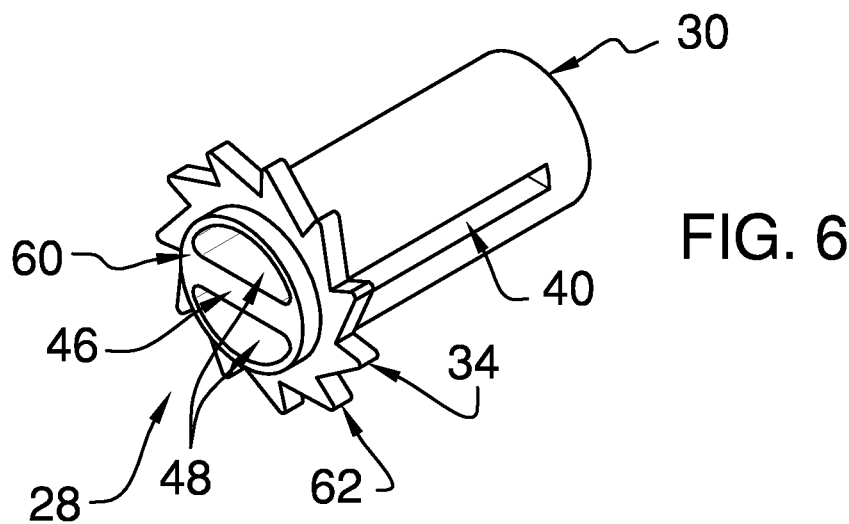
FIG. 6 is a detail view of an embodiment of the disclosure.
Figure 7:
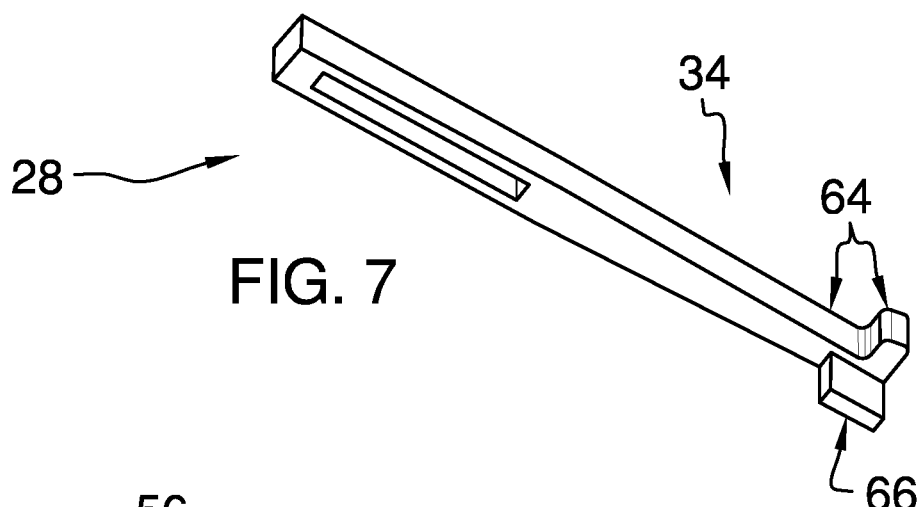
FIG. 7 is a detail view of an embodiment of the disclosure.
Figure 8:
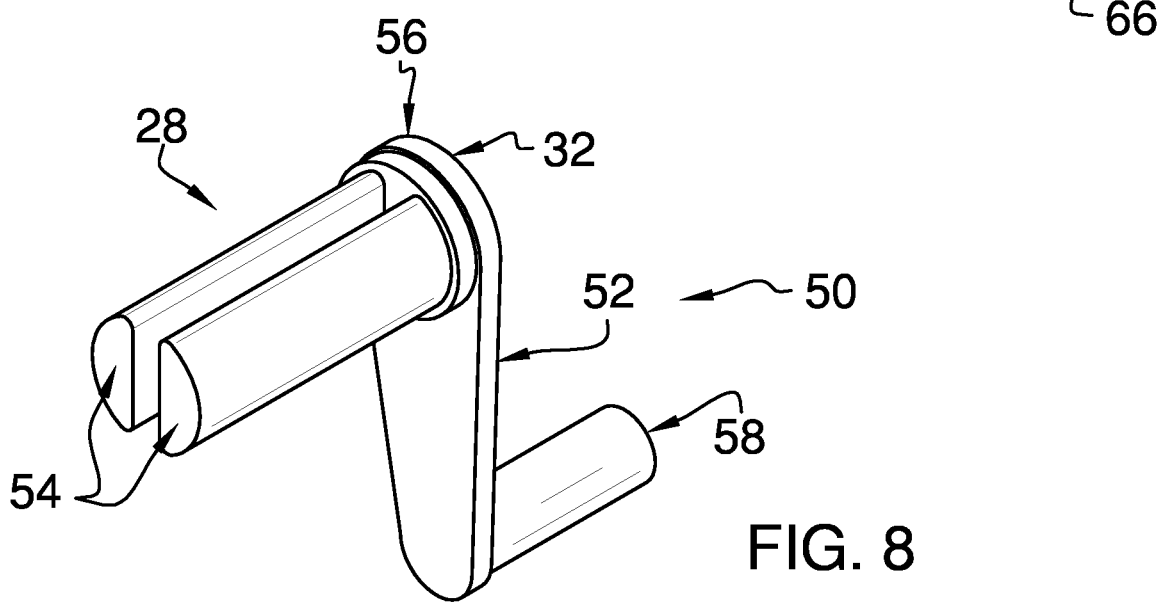
FIG. 8 is a detail view of an embodiment of the disclosure.
Figure 9:
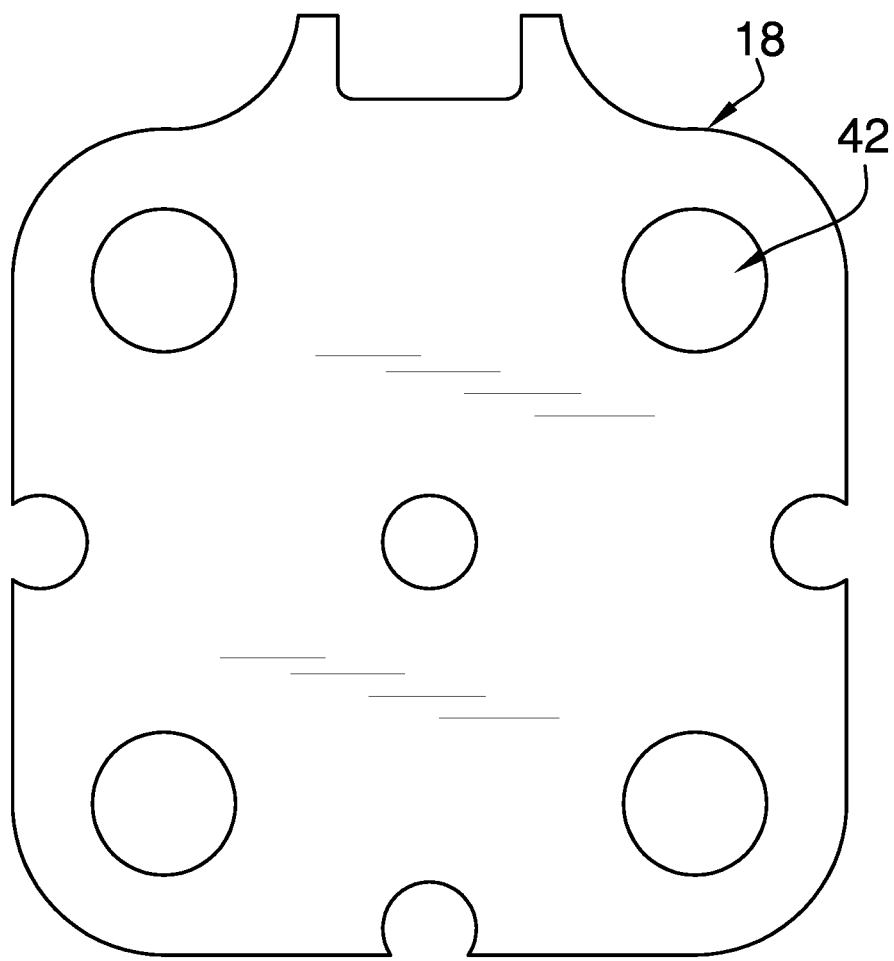
FIG. 9 is a detail view of an embodiment of the disclosure.
Figure 10:
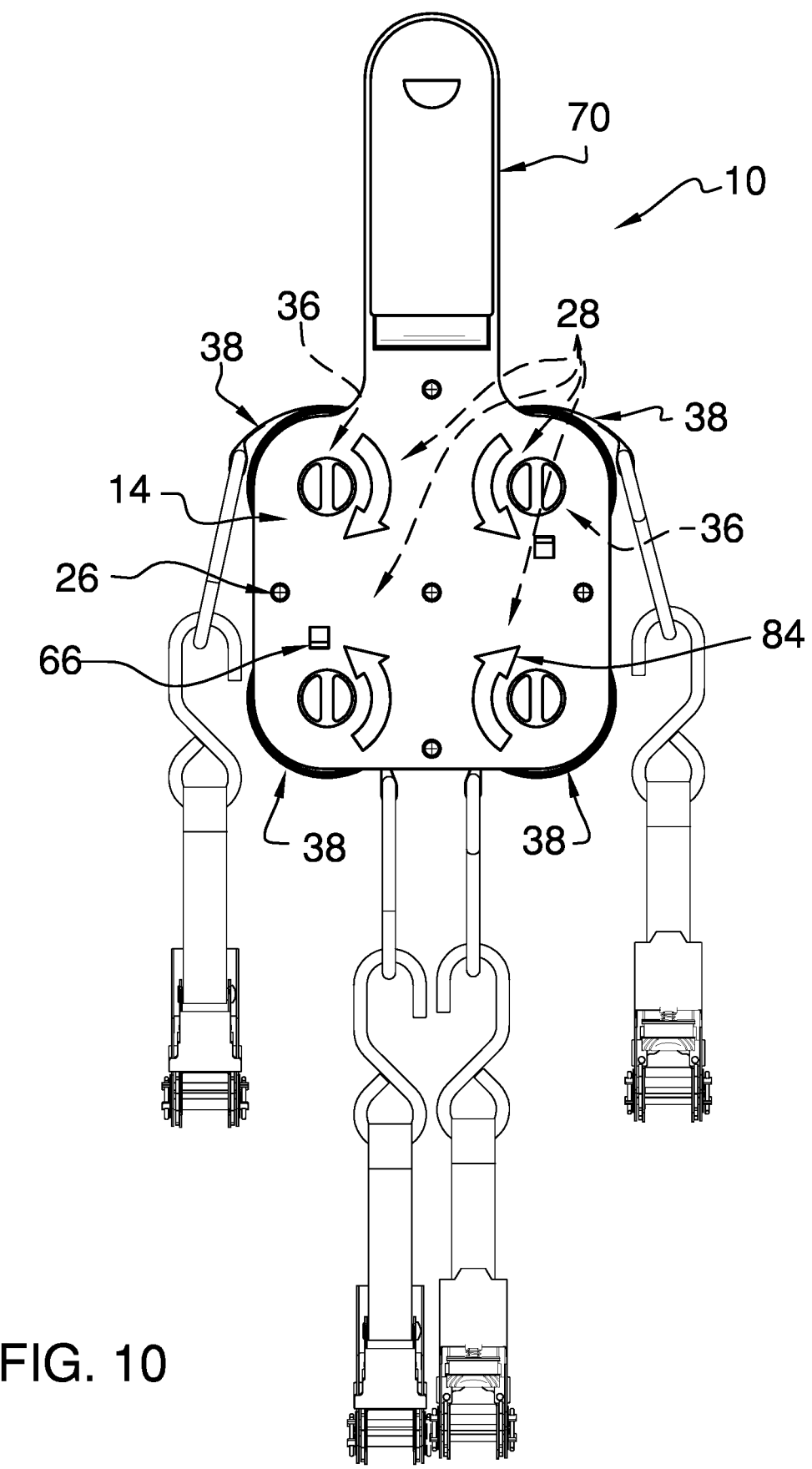
FIG. 10 is an in-use view of an embodiment of the disclosure.

Each of a set of strap stowing units 28 engaged to the pair of plates 14 comprises a spindle 30, which has a winding element 32 and a braking element 34 operationally engaged thereto. The spindle 30 is rotationally engaged to and extends between the plates 14. The spindle 30 is configured to selectively engage a respective end 36 of a strap 38 so that the strap 38 is removably engaged to the spindle 30. The spindle 30 has a slot 40 extending thereinto, as shown in FIG. 6. The slot 40 is configured for insertion of the respective end 36 of the strap 38 so that the strap 38 is removably engaged to the spindle 30. The present invention also anticipates the strap 38 being removably engageable to the spindle 30 via other engagement means, such as, but not limited to, magnets, hook and loop fasteners, and the like.

The spindle 30 is positioned through a pair of first holes 42, which are positioned singly in the inner walls 18. The spindle 30 extends to proximate to a pair of second holes 44, which are positioned singly in the outer walls 20. The spindle 30 is tubular and has a slat 46 engaged thereto, positioned therein, and extending therethrough, to define a pair of channels 48, as shown in FIG. 6.

The winding element 32 is positioned to selectively rotate the spindle 30, in a first direction, to coil the strap 38 therearound. The winding element 32 may comprise a crank key 50, which is selectively engageable to the spindle 30 through a respective second hole 44. The present invention anticipates the winding element 32 comprising other winding means, such as, but not limited to, motors, coiled springs, and the like.

The crank key 50 may comprise an arm 52 and a pair of extensions 54. The arm 52 is L-shaped and the extensions 54 extend from a first terminus 56 of the arm 52. The extensions 54 are complementary to the channels 48 and thus are positioned to be inserted into the channels 48. The arm 52 is configured to be grasped proximate to a second terminus 58 thereof, positioning a user to rotate the spindle 30. The present invention anticipates the crank key 50 and a respective opposed end 60 of the spindle 30 having other, though still complementary, shapes, which would allow the crank key 50 to operationally engaged the spindle 30. For example, a spindle 30 wherein the respective opposed end 60 is complementary to a bit (not shown) of a rotary tool (not shown) could be rotated by the rotary tool.

The braking element 34 is engaged to a respective one of the plates 14 and is positioned to selectively engage the spindle 30, to prevent rotation thereof, to retain the strap 38 around the spindle 30. The braking element 34 also is positioned to selectively disengage the spindle 30 so that the spindle 30 is configured to rotate in a second direction to uncoil the strap 38 therefrom.

The braking element 34 may comprise a ratchet 62 and a pawl 64. The ratchet 62 is engaged to the spindle 30 proximate to a respective opposed end 60 thereof. The pawl 64 is engaged to the respective plate 14 and is operationally engaged to the ratchet 62 so that the ratchet 62 is freely rotatable in the first direction to coil the strap 38 around the spindle 30. The ratchet 62 is prevented by the pawl 64 from freely rotating in the second direction to retain the strap 38 around the spindle 30.

Figure 5:
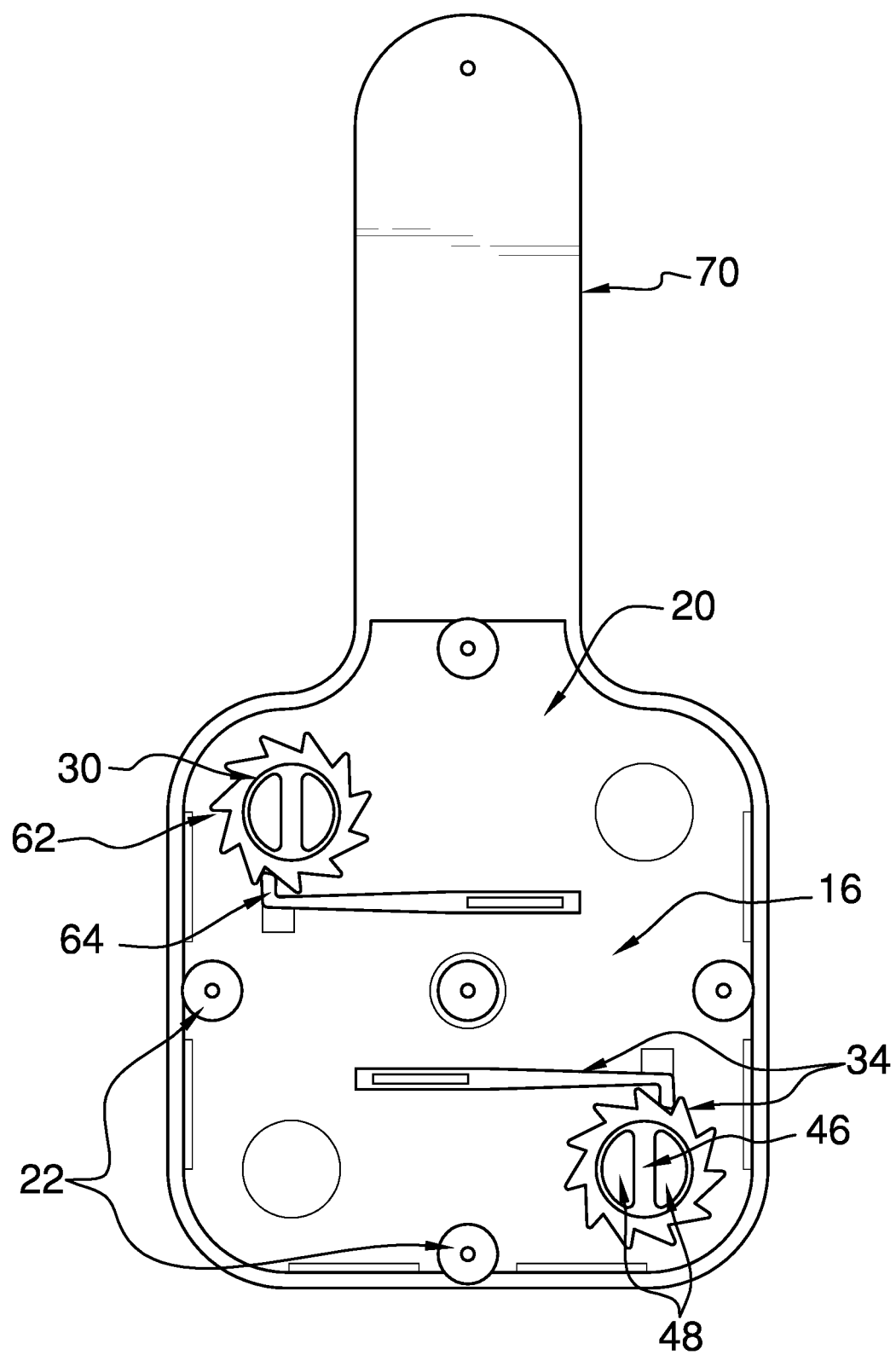
FIG. 5 is a detail view of an embodiment of the disclosure.

A tab 66 engaged to the pawl 64 extends through an aperture 68 positioned in the respective plate 14. The tab 66 is configured to be engaged by a digit of a hand of the user so that the user is positioned to push on the tab 66 to disengage the pawl 64 from the ratchet 62, rendering the ratchet 62 rotatable in the second direction to allow for uncoiling of the strap 38 from the spindle 30. The ratchet 62 and the pawl 64 may be positioned in the chamber 16, as shown in FIG. 5. The present invention also anticipates the braking element 34 comprising other braking means, such as, but not limited to, compression fittings, snap lock fittings, and the like.

The set of strap stowing units 28 may comprise four strap stowing units 28, as shown in FIG. 1, or other number of strap stowing units 28, such as, but not limited to, one to three, or five or more strap stowing units 28. The present invention also anticipates directional arrows 84 positioned on the plates 14 proximate to the spindles 30.

The directional arrow 84 proximate to a respective spindle 30 would indicate the first direction for turning the respective spindle 30 for coiling a strap 38 thereupon.

Figure 2:
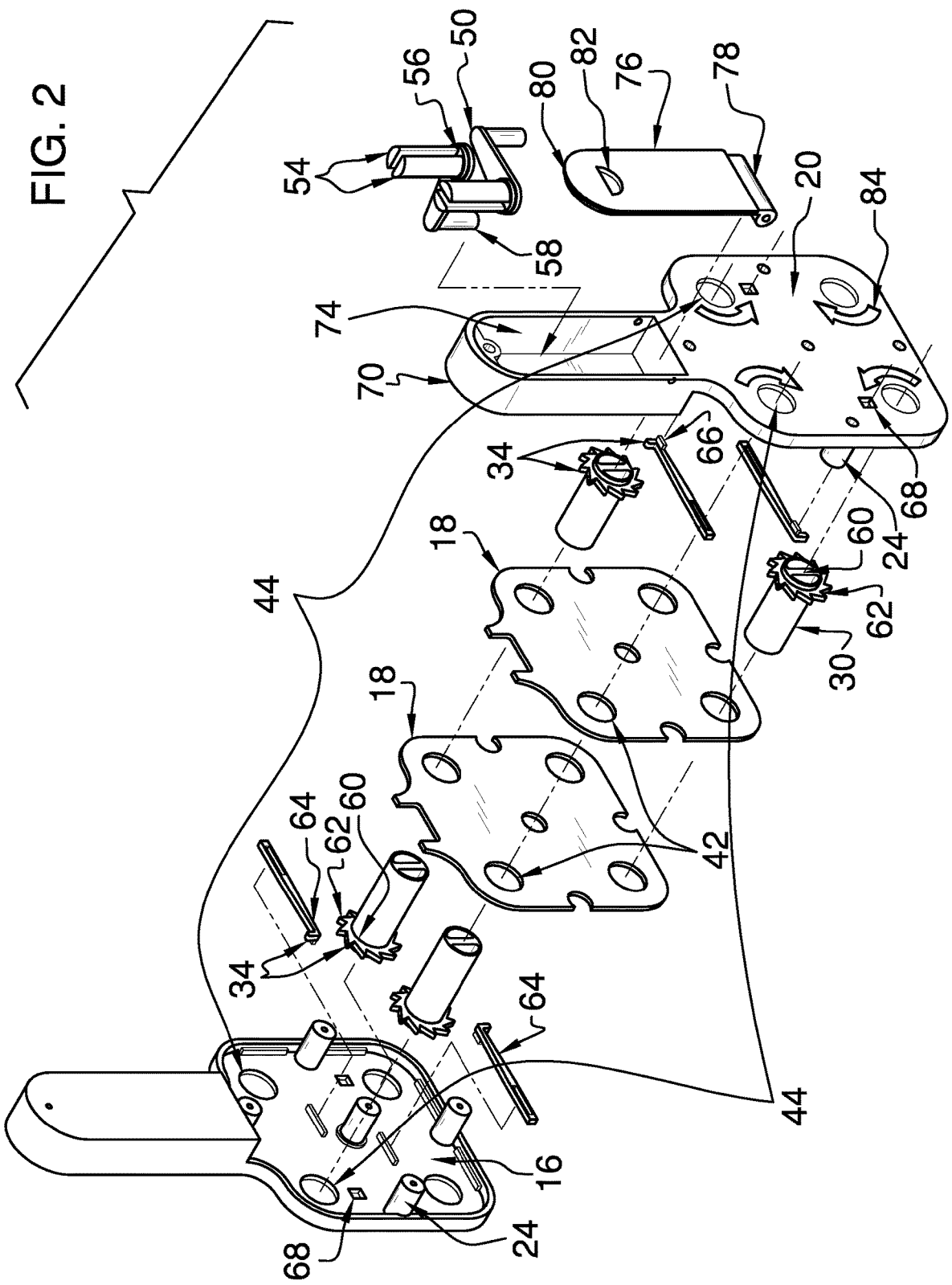
FIG. 2 is an exploded view of an embodiment of the disclosure.
Figure 3:
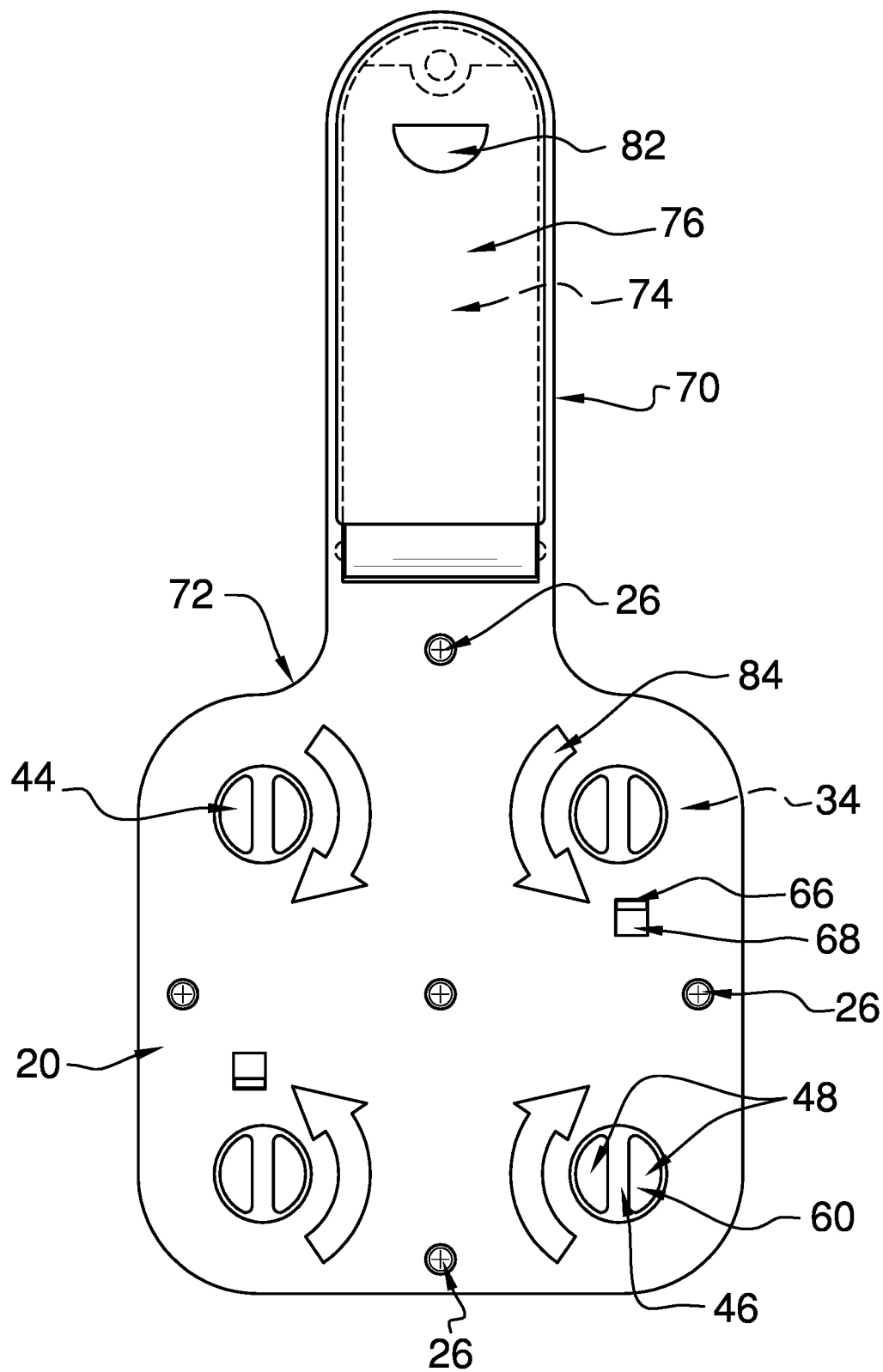
FIG. 3 is a front view of an embodiment of the disclosure.
Figure 4:
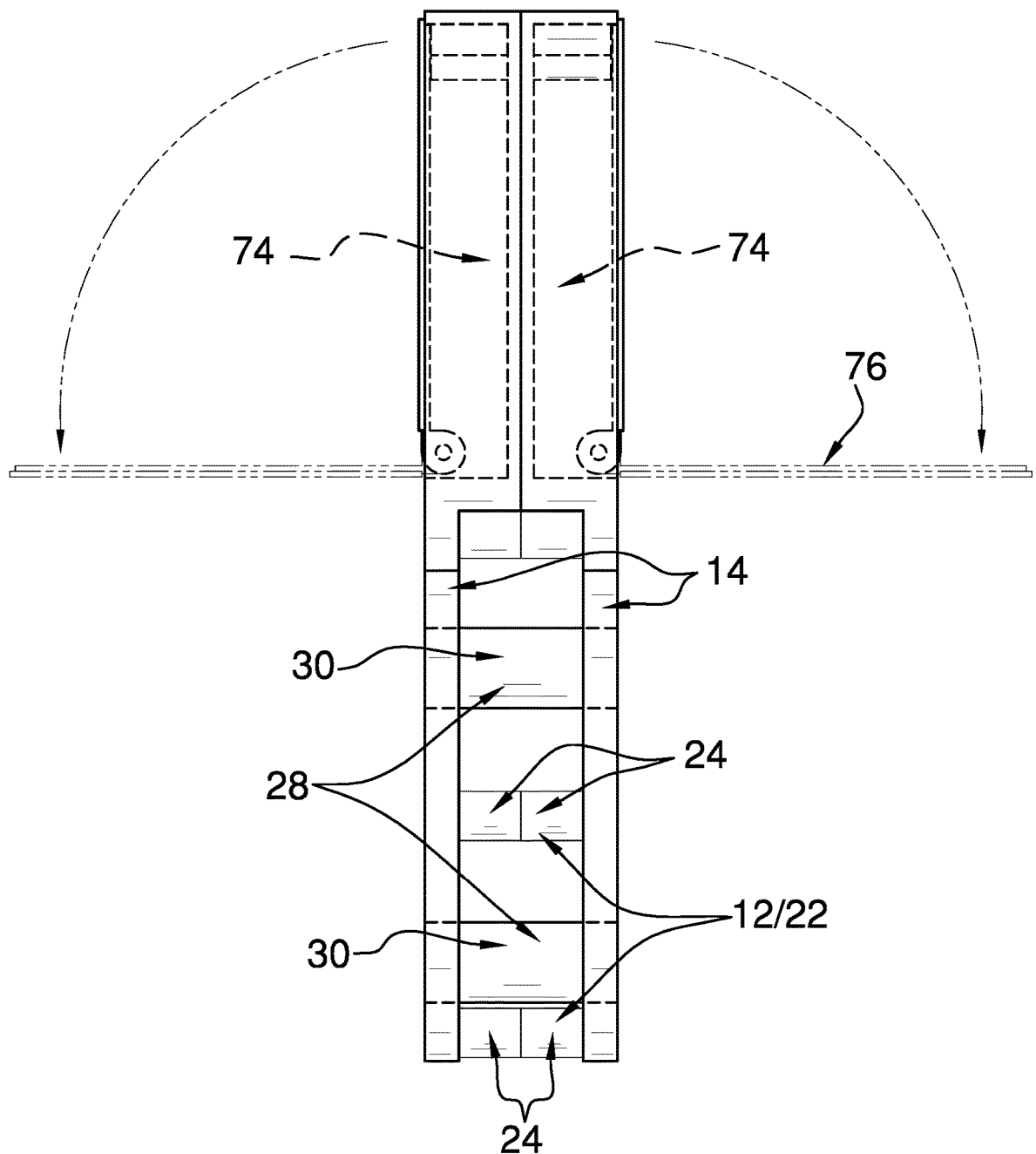
FIG. 4 is a side view of an embodiment of the disclosure.

A handle 70 engaged to and extending from a top 72 of the pair of plates 14 is configured to be grasped in the hand of the user. The handle 70 has a recess 74 extending thereinto which is positioned for stowage of the crank key 50. The handle 70 may be one of a pair of handles 70, with each handle 70 being engaged to a respective plate 14 of the pair of plates 14, as shown in FIG. 2.

The assembly 10 also comprises a panel 76, which is selectively engageable to the handle 70 to close the recess 74 to retain the crank key 50 therein. The panel 76 has a lower end 78 and an upper end 80, with the lower end 78 being hingedly engaged to the handle 70 and the upper end 80 being selectively couplable to the handle 70 to close the recess 74. The panel 76 has a cutout 82 positioned therein proximate to the upper end 80. The cutout 82 is configured for insertion of the digit of the hand of the user so that the user is positioned to hinge the panel 76 to access the recess 74. The cutout 82 also is configured for selective insertion of a hanging element (not shown), such as a hook, which is engaged to a surface, to removably engage the handle 70 to the surface.

In use, the respective end 36 of the strap 38 is inserted into the slot 40 positioned in a respective spindle 30 and the extensions 54 of the crank key 50 are inserted into the channels 48 of the respective spindle 30. The crank key 50 then is turned in the first direction so that the strap 38 coils upon the spindle 30. When the strap 38 is required for use, it is dispensed by first depressing the tab 66 to disengage the pawl 64 from the ratchet 62 and then pulling on the strap 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A strap winding, storage, and dispensing assembly comprising:
   a pair of plates;
   a spacing element engaged to and extending between the plates, such that the plates are aligned and parallel planarly positioned; and
   a set of strap stowing units engaged to the pair of plates, each strap stowing unit comprising:
      a spindle rotationally engaged to and extending between the plates, the spindle being configured for selectively engaging a respective end of a strap, such that the strap is removably engaged to the spindle;
      a winding element operationally engaged to the spindle, such that the winding element is positioned for selectively rotating the spindle in a first direction for coiling the strap therearound, and
      a braking element engaged to a respective one of the plates and being operationally engaged to the spindle, such that the braking element is positioned for selectively engaging the spindle for preventing rotation thereof for retaining the strap around the spindle, and such that the braking element is positioned for selectively disengaging from the spindle, wherein the spindle is configured for rotating in a second direction for uncoiling the strap therefrom.

2. The strap winding, storage, and dispensing assembly of claim 1, wherein each plate has a chamber positioned therein defining an inner wall and an outer wall of the plate.

3. The strap winding, storage, and dispensing assembly of claim 2, wherein the inner wall is selectively couplable to the outer wall.

4. The strap winding, storage, and dispensing assembly of claim 2, wherein the spacing element comprises a plurality of cylinders, each of the cylinders being engaged to and extending between the outer walls of the pair of plates.

5. The strap winding, storage, and dispensing assembly of claim 4, wherein:
   the cylinder is tubular; and
   the cylinder comprises a pair of segments engaged singly to the outer walls, such that the segments of the pair of segments are selectively alignable, positioning the segments for threaded insertion of a screw for mutually engaging the plates.

6. The strap winding, storage, and dispensing assembly of claim 2, wherein:
   the spindle is positioned through a pair of first holes positioned singly in the inner walls and extends to proximate to a pair of second holes positioned singly in the outer walls; and
   the winding element comprises a crank key selectively engageable to the spindle through a respective second hole.

7. The strap winding, storage, and dispensing assembly of claim 6, wherein:
   the spindle is tubular;
   the spindle has a slat engaged thereto, positioned therein, and extending therethrough, defining a pair of channels; and
   the crank key comprises an arm and a pair of extensions, the arm being L-shaped, the extensions extending from a first terminus of the arm and being complementary to the channels, such that the extensions are positioned for insertion into the channels, wherein the arm is configured for grasping proximate to a second terminus thereof, positioning a user for rotating the spindle.

8. The strap winding, storage, and dispensing assembly of claim 6, further including:
   a handle engaged to and extending from a top of the pair of plates, wherein the handle is configured for grasping in a hand of a user;
   the handle having a recess extending thereinto, such that the recess is positioned for stowage of the crank key; and
   a panel selectively engageable to the handle for closing the recess for retaining the crank key therein.

9. The strap winding, storage, and dispensing assembly of claim 8, wherein the panel has a lower end and an upper end, the lower end being hingedly engaged to the handle, the upper end being selectively couplable to the handle for closing the recess.

10. The strap winding, storage, and dispensing assembly of claim 8, wherein the panel has a cutout positioned therein proximate to an upper end thereof, wherein the cutout is configured for insertion of a digit of the hand of the user, positioning the user for hinging the panel for accessing the recess, and wherein the cutout is configured for selective insertion of a hanging element engaged to a surface, for removably engaging the handle to the surface.

11. The strap winding, storage, and dispensing assembly of claim 1, wherein the spacing element comprises a plurality of cylinders.

12. The strap winding, storage, and dispensing assembly of claim 1, wherein the set of strap stowing units comprises four strap stowing units.

13. The strap winding, storage, and dispensing assembly of claim 1, wherein the spindle has a slot extending thereinto, wherein the slot is configured for insertion of the respective end of the strap, such that the strap is removably engaged to the spindle.

14. The strap winding, storage, and dispensing assembly of claim 1, wherein the braking element comprises:
   a ratchet engaged to the spindle proximate to a respective opposed end thereof;
   a pawl engaged to the respective plate and being operationally engaged to the ratchet, such that the ratchet is freely rotatable in the first direction for coiling the strap around the spindle, and such that the ratchet is prevented from freely rotating in the second direction for retaining the strap around the spindle; and
   a tab engaged to the pawl and extending through an aperture positioned in the respective plate, wherein the tab is configured for being engaged by a digit of a hand of a user, positioning the user for pushing on the tab for disengaging the pawl from the ratchet, such that the ratchet is rotatable in the second direction for uncoiling the strap from the spindle.

15. The strap winding, storage, and dispensing assembly of claim 1, further including a handle engaged to and extending from a top of the pair of plates, wherein the handle is configured for grasping in a hand of a user.

16. A strap winding, storage, and dispensing assembly system comprising:

a set of straps;

a pair of plates;

a spacing element engaged to and extending between the plates, such that the plates are aligned and parallel planarly positioned; and a set of strap stowing units engaged to the pair of plates, each strap stowing unit comprising:

a spindle rotationally engaged to and extending between the plates, the spindle being configured for selectively engaging a respective end of a respective strap of the set of straps, such that the respective strap is removably engaged to the spindle, a winding element operationally engaged to the spindle, such that the winding element is positioned for selectively rotating the spindle in a first direction for coiling the respective strap therearound, and a braking element engaged to a respective one of the plates and being operationally engaged to the spindle, such that the braking element is positioned for selectively engaging the spindle for preventing rotation thereof for retaining the respective strap around the spindle, and such that the braking element is positioned for selectively disengaging from the spindle, such that the spindle is positioned for rotating in a second direction for uncoiling the respective strap therefrom.

17. A strap winding, storage, and dispensing assembly comprising:

a pair of plates, each plate having a chamber positioned therein defining an inner wall and an outer wall of the plate, the inner wall being selectively couplable to the outer wall;

a spacing element engaged to and extending between the plates, such that the plates are aligned and parallel planarly positioned, the spacing element comprising a plurality of cylinders, each of the cylinders being engaged to and extending between the outer walls of the pair of plates, the cylinder being tubular, the cylinder comprising a pair of segments engaged singly to the outer walls, such that the segments of the pair of segments are selectively alignable, positioning the segments for threaded insertion of a screw for mutually engaging the plates;

a set of strap stowing units engaged to the pair of plates, the set of strap stowing units comprising four strap stowing units, each strap stowing unit comprising:

a spindle rotationally engaged to and extending between the plates, the spindle being configured for selectively engaging a respective end of a strap, such that the strap is removably engaged to the spindle, the spindle having a slot extending thereinto, wherein the slot is configured for insertion of the respective end of the strap, such that the strap is removably engaged to the spindle, the spindle being positioned through a pair of first holes positioned singly in the inner walls and extending to proximate to a pair of second holes positioned singly in the outer walls, the spindle being tubular, the spindle having a slat engaged thereto, positioned therein, and extending therethrough, defining a pair of channels, a winding element operationally engaged to the spindle, such that the winding element is positioned for selectively rotating the spindle in a first direction for coiling the strap therearound, the winding element comprising a crank key selectively engageable to the spindle through a respective second hole, the crank key comprising an arm and a pair of extensions, the arm being L-shaped, the extensions extending from a first terminus of the arm and being complementary to the channels, such that the extensions are positioned for insertion into the channels, wherein the arm is configured for grasping proximate to a second terminus thereof, positioning a user for rotating the spindle, and a braking element engaged to a respective one of the plates and being operationally engaged to the spindle, such that the braking element is positioned for selectively engaging the spindle for preventing rotation thereof for retaining the strap around the spindle, and such that the braking element is positioned for selectively disengaging from the spindle, wherein the spindle is configured for rotating in a second direction for uncoiling the strap therefrom, the braking element comprising:

a ratchet engaged to the spindle proximate to a respective opposed end thereof, a pawl engaged to the respective plate and being operationally engaged to the ratchet, such that the ratchet is freely rotatable in the first direction for coiling the strap around the spindle, and such that the ratchet is prevented from freely rotating in the second direction for retaining the strap around the spindle, and a tab engaged to the pawl and extending through an aperture positioned in the respective plate, wherein the tab is configured for being engaged by a digit of a hand of the user, positioning the user for pushing on the tab for disengaging the pawl from the ratchet, such that the ratchet is rotatable in the second direction for uncoiling the strap from the spindle;

a handle engaged to and extending from a top of the pair of plates, wherein the handle is configured for grasping in the hand of the user, the handle having a recess extending thereinto, such that the recess is positioned for stowage of the crank key; and a panel selectively engageable to the handle for closing the recess for retaining the crank key therein, the panel having a lower end and an upper end, the lower end being hingedly engaged to the handle, the upper end being selectively couplable to the handle for closing the recess, the panel having a cutout positioned therein proximate to the upper end, wherein the cutout is configured for insertion of the digit of the hand of the user, positioning the user for hinging the panel for accessing the recess, and wherein the cutout is configured for selective insertion of a hanging element engaged to a surface, for removably engaging the handle to the surface.

* * * * *